June 6, 1961  J. C. RUNDLETT  2,987,719
OBJECT LOCATING SYSTEM
Filed Nov. 23, 1945  3 Sheets-Sheet 1

INVENTOR
JAMES C. RUNDLETT
BY
ATTORNEY

June 6, 1961  J. C. RUNDLETT  2,987,719
OBJECT LOCATING SYSTEM
Filed Nov. 23, 1945  3 Sheets-Sheet 2

INVENTOR
JAMES C. RUNDLETT
BY
ATTORNEY

June 6, 1961  J. C. RUNDLETT  2,987,719
OBJECT LOCATING SYSTEM
Filed Nov. 23, 1945  3 Sheets-Sheet 3
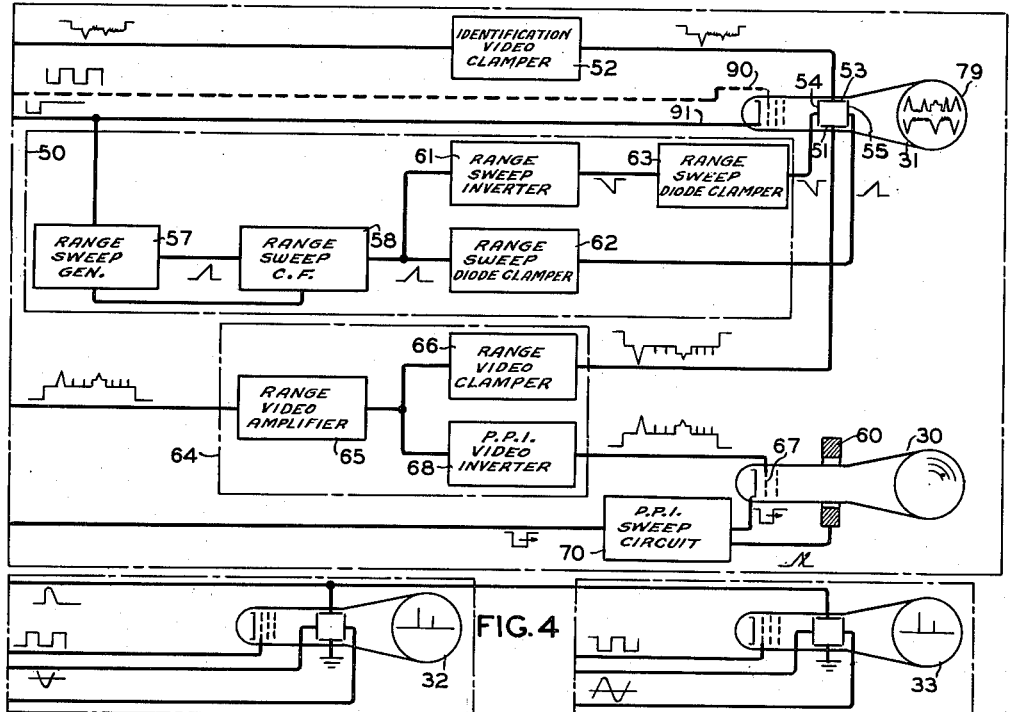
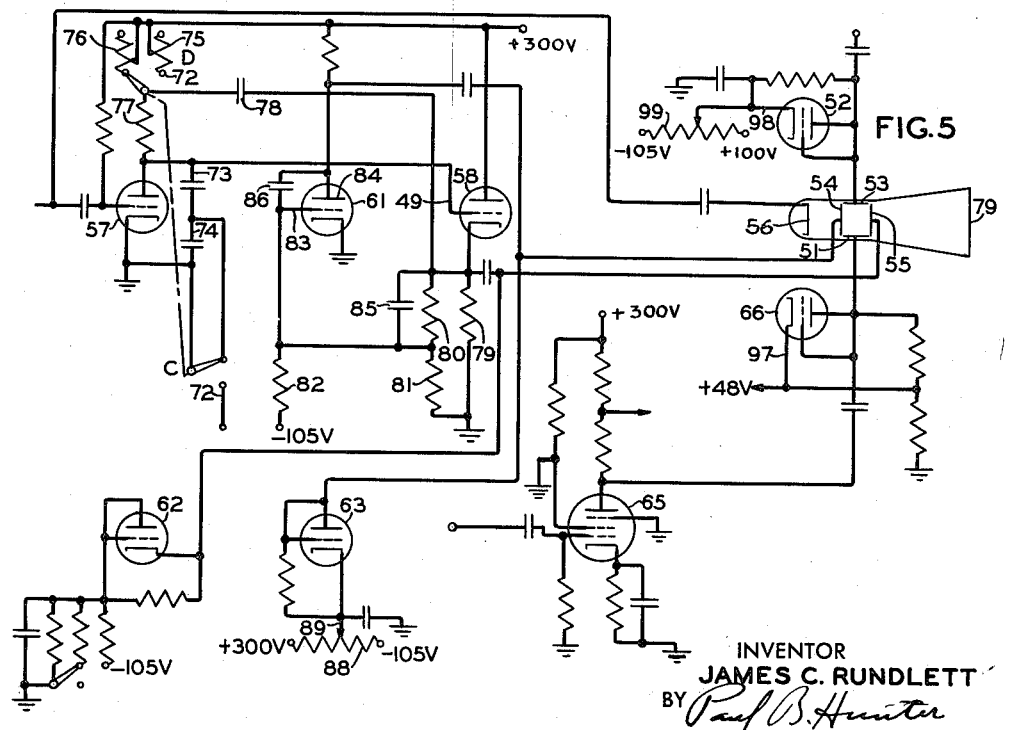
INVENTOR
JAMES C. RUNDLETT
BY Paul B. Hunter
ATTORNEY 2,987,719
OBJECT LOCATING SYSTEM
James C. Rundlett, Pelham Manor, N.Y., assignor to Sperry Rand Corporation, a corporation of Delaware
Filed Nov. 23, 1945, Ser. No. 630,192
7 Claims. (Cl. 343—6.5)

This invention relates generally to object detecting systems and, more particularly, to apparatus and methods including timing devices used to provide synchronism in the control of separate components included in such systems.

The general function of all object detecting and tracking systems employed at very high frequencies is to determine the position of objects or targets by searching the surrounding environment, to ascertain the presence of such target or objects, present representations of such objects visually on an indicating device and to continuously track a selected target or group of targets so that such targets may be held within a line of sight at all times.

In the process of target selection, it is highly desirable to make available a source of information which permits discrimination between the individual targets represented on the indicator device.

In time of war, such a system is necessary so as to determine which aircraft belongs to a defender's forces, and so to be identified as friendly, in contradistinction to those belonging to the enemy. In time of peace, among other uses, such identification makes possible air traffic control systems in which individual aircraft may be identified from among a plurality of signals indicative of approaching objects or aircraft.

The microwave detecting-tracking system in which the presently improved synchronizing device is employed operates on a 400 cycle pulse repetition frequency which has been found most suitable as adapted to a method of tracking as described in copending application Serial No. 518,278, filed in the names of Walter N. Dean and James C. Rundlett, now Patent No. 2,537,973. In this system, four transmitter pulses are synchronized to one spin motor revolution of the microwave antenna.

The transformation of such an object detecting-tracking system into a combined object locating and object identifying device system without alteration in the pulse repetition rate for which the system is fundamentally designed, constitutes a highly novel feature herein since there is presented for the first time a centralized control for an improved presentation of data which simultaneously permits location, tracking and identification of approaching aircraft.

Generally speaking, pulses of high frequency energy are transmitted from two separate transmitters having different carrier frequencies. One transmitter propagates energy in discrete bursts at a given pulse recurrence frequency so as to impinge this energy upon a target, such as an aircraft, which reflects a portion of the signal to an associated receiver tuned to the transmitter frequency. A second transmitter alternately triggered propagates energy at the same pulse recurrency frequency but at a different carrier frequency and is received at the target by an intermediate agency, such as a transponder, which returns or rebroadcasts a signal properly coded to a second receiver tuned to the rebroadcast frequency.

Since both transmitters are keyed alternately, a target equipped with such a transponder will return the reflected, search signals and the rebroadcast, identification signals to the differently tuned receivers. By utilizing a cathode ray tube indicator having synchronized parallel time bases or even a single time base generated at twice the usual frequency, the placement of both received signals in coincidence therealong will provide means for identifying friendly aircraft or targets. Signals received from the transponder are usually inverted so as not to cause confusion. If any loss of time occurs in rebroadcasting via the transponder compensation therefor is easily afforded as by delaying the signals in the search circuit relative to those in the identification circuit through utilization of a delay time circuit or multivibrator.

Although in carrying out the invention in its preferred form separate receiver and transmitting antennae are shown, it is to be understood that one antenna may be used both for transmitting and receiving as by inserting electronic switching means operative between one transmitting channel and its associated receiving channel; such means being a "TR" box, providing a high impedance to the strong transmitted signals while precluding any injury to the associated receiver as shown in FIG. 1.

It is to be understood, too, that although in the present embodiment of the invention, two carrier frequencies are transmitted, this is not necessary, since one frequency could be used with a variation in modulation, such as frequency or phase modulation, used to distinguish the source of the transmitted or rebroadcast signals.

Thus, a primary object of this invention is to present a satisfactory solution for a target identification problem so as to make possible the determination of selected targets.

Another object of the present invention is to provide a novel synchronizing system to be utilized in high frequency object detecting and tracking systems.

Still another obje ct of this invention is to provide means for synchronizing the separate components utilized in microwave detecting-tracking systems so as to provide accurate identification of selected targets.

Yet another object of this invention is to present a novel share time synchronizing system to be utilized in object detecting-tracking systems so as to provide accurate identification of selected targets.

Still another object of this invention is to present a novel share time-blanking-synchronizing system to be utilized in object detecting and tracking systems so as to provide accurate identification of selected targets.

A further object of the invention is to provide improved apparatus and instrumentalities adapted for use in realizing the above objects and also adapted for use in other fields.

A better understanding of the invention will be afforded by the following detailed description considered in connection with the accompanying drawings, in which:

FIG. 4 is a block diagram illustrating the presentation system employed in the present embodiment of the invention; and FIG. 5 is a simplified schematic diagram illustrating the electronic circuits associated with the horizontal sweep range scope used to present identification data.

Like reference characters are utilized throughout the drawings to designate like parts or components.

Figure 1:
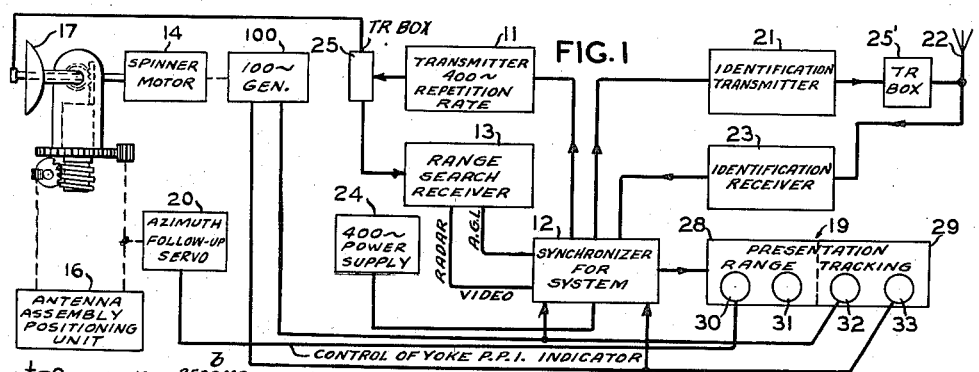
FIG. 1 is an overall block diagram used to generally illustrate the operation of an object detecting, identifying and tracking system.

Referring now to FIG. 1, there is shown in overall block diagram the presently employed improved object detecting, tracking and identification radar system. The block diagram has been divided into the most important components of the system in order to functionally relate the operation thereof.

Radar transmitter 11 generates radio frequency pulses of very narrow width, high-power and high-frequency in the order of 3000 megacycles per second. Transmitter 11 has a pulse recurrence frequency of 400 cycles per second, being triggered once every 2500 microseconds by synchronizer 12 which is used to synchronize all the components of the system.

Pulses from transmitter 11 radiated by antenna 17 impinge on a target in space and reflections therefrom are received on same antenna 17 and are routed to radar receiver 13. A single antenna may be used since the strong pulses from transmitter 11 are inoperative to effect radar receiver 13 throuh the utilization of an electronic switching device, such as "TR" box 25 provided intermediate transmitter 11 and radar receiver 13. The antenna may be an asymmetrical dipole which is rotated in the present system at approximately 6000 r.p.m. by antenna spinner motor 14. Thus conical scanning is made possible. Antenna 17 is rotated within parabolic reflector 26 which has the same basic properties as an ordinary searchlight reflector.

In searching for targets the antenna assembly comprising antenna 17 and reflector 26 is rotated in azimuth and tilted in elevation by unit 16 in order to cover the space around the radar equipment.

Radar receiver 13 receives and amplifies the target echoes. When a target has been selected for tracking, the gain of the receiver is automatically controlled by automatic gain control voltages received from synchronizer 12. The video output of receiver 13 is fed to synchronizer 12 which provides the timing for the entire radar system.

Synchronizer 12 provides the timing control for the entire radar system as by generating trigger pulses for the transmitter system; by supplying the automatic gain control voltage to the receiver; and by routing signals received from the receiver to the presentation unit 19.

Presentation unit 19 displays target echoes and makes it possible to track a selected target. In the present system, the presentation unit includes a range indicator unit 28 as well as two tracking indicators 29. The range indicating unit includes a plan position indicator scope 30 and a range scope 31.

The plan position indicator scope 30 gives a virtual map of the entire area surrounding the radar set and displays all targets within the range of the set as bright spots along a radial sweep trace with the position of the sweep trace correspondng at all times to the azimuth direction in which antenna 17 is pointing, and with the distance of the target echoes from the center of the scope along the radial sweep representing the range of the targets. Thus the plan position indicator scope 30 provides azimuth and range information for all targets.

The position of the plan position sweep trace is controlled and synchronized with the antenna unit by means of servo 20 which provides control over the magnetic yoke 60 (FIG. 4) surrounding the plan position indicator scope 30.

Included in the presentation unit is also an "A" type oscilloscope or indicator 31 on which targets are displayed as vertical deviations or pips along a horizontal sweep trace. Thus by means of the "A" range scope 31, one of the targets may be selected for tracking. After a target has been selected for tracking, the tracking indicators 32, 33 display the information obtained from the process of conical scanning.

While transmitter 11 is triggered by synchronizer 12 during the first half of the pulse recurrence interval, a separate identification transmitter 21 having a different carrier frequency is alternately triggered at the same pulse recurrence frequency during the second half of the interval, and thus both transmitters share the same pulse interval. These latter transmitted signals are received by a transponder in an aircraft which rebroadcasts a coded signal which is received back on transmitting-receiving antenna 22. The received signals are routed to identification receiver 23 and are passed on to synchronizer 12 for acceptance by the presentation unit 19. By comparing the receipt of a radar search signal with a rebroadcast or identification signal on presentation unit 19, the identity of a friendly target is determined.

The sharing of one pulse recurrence interval of 2500 microseconds by both the search and identification circuits is made possible by utilizing a pulse recurrence frequency of 400 with 1250 microseconds allocated to each circuit, a time interval more than sufficient to encompass the maximum desired range coverage.

The heart of the object detecting-tracking system resides in the synchronizer unit 12 which provides the fundamental timing for the entire system. Synchronizer unit 12 generates the trigger voltages required by the other components of the system and by the identification equipment used in conjunction therewith. In the present invention, the fundamental timing source for the synchronizer 12 as well as for the entire detecting system is a 400 cycle sine wave voltage delivered from power supply unit 24.

The pulse recurrence frequency of the system is thus established at 400 pulses per second. By means of a center-tap transformer (not shown) in the power supply 24, two 400 cycle sine wave voltages which are 180° out of phase are obtained. These voltages indicated by $\alpha$ and $\beta$ in Fig. 3A, provide the timing for the synchronizer circuits. The instant at which the $\alpha$ voltage wave starts to rise from zero value is assumed to be zero time, or the time ($t$) equals zero microseconds.

The pulse recurrence frequency of the system is, as stated, four times as great as the frequency at which scanning occurs. Since this is true, the start of that cycle of the $\alpha$ voltage which results in the process of scanning is also assumed to be zero time.

Figure 3:
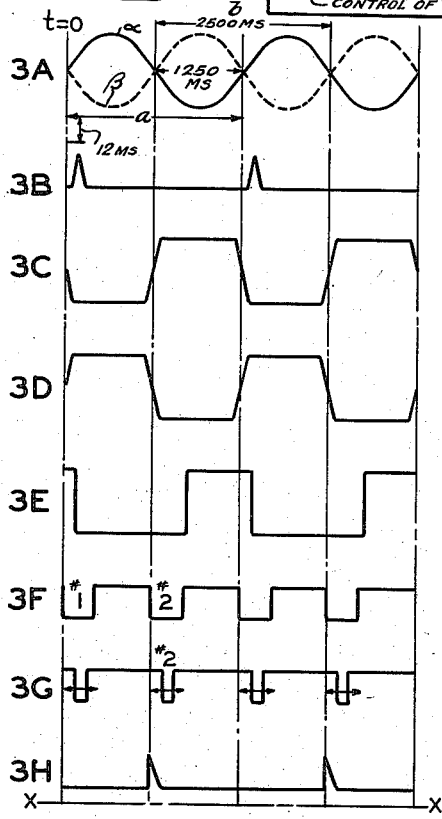
FIG. 3 is used to illustrate the timing coincidence or synchronism between various voltage wave forms present at representative points in the aforestated embodiment of the invention.
Figure 3:
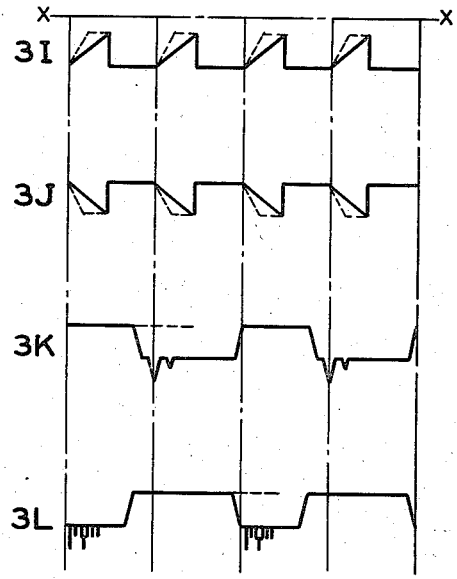

A proper understanding of the timing sequences involved in the synchronizer and presentattion systems may be obtained by utilizing FIG. 3.

The 2,500-microsecond period ($a$, $b$) of the 400 cycle $\alpha$ sine wave voltage is divided into two equal intervals. The first 1,250-microsecond interval, or first half-cycle, is called the radar cycle, since the entire radar action (target detection and display) of the equipment is confined to this period. The second half-cycle, starting at the time when ($t$) equals 1,250 microseconds, is called the identification cycle. This time is reserved for the operation of the identification equipment used in conjunction with the radar equipment, and for the display of the response received from friendly targets to the identification challenge pulse. The presentation component of the system displays both items of information when so desired.

Figure 2:
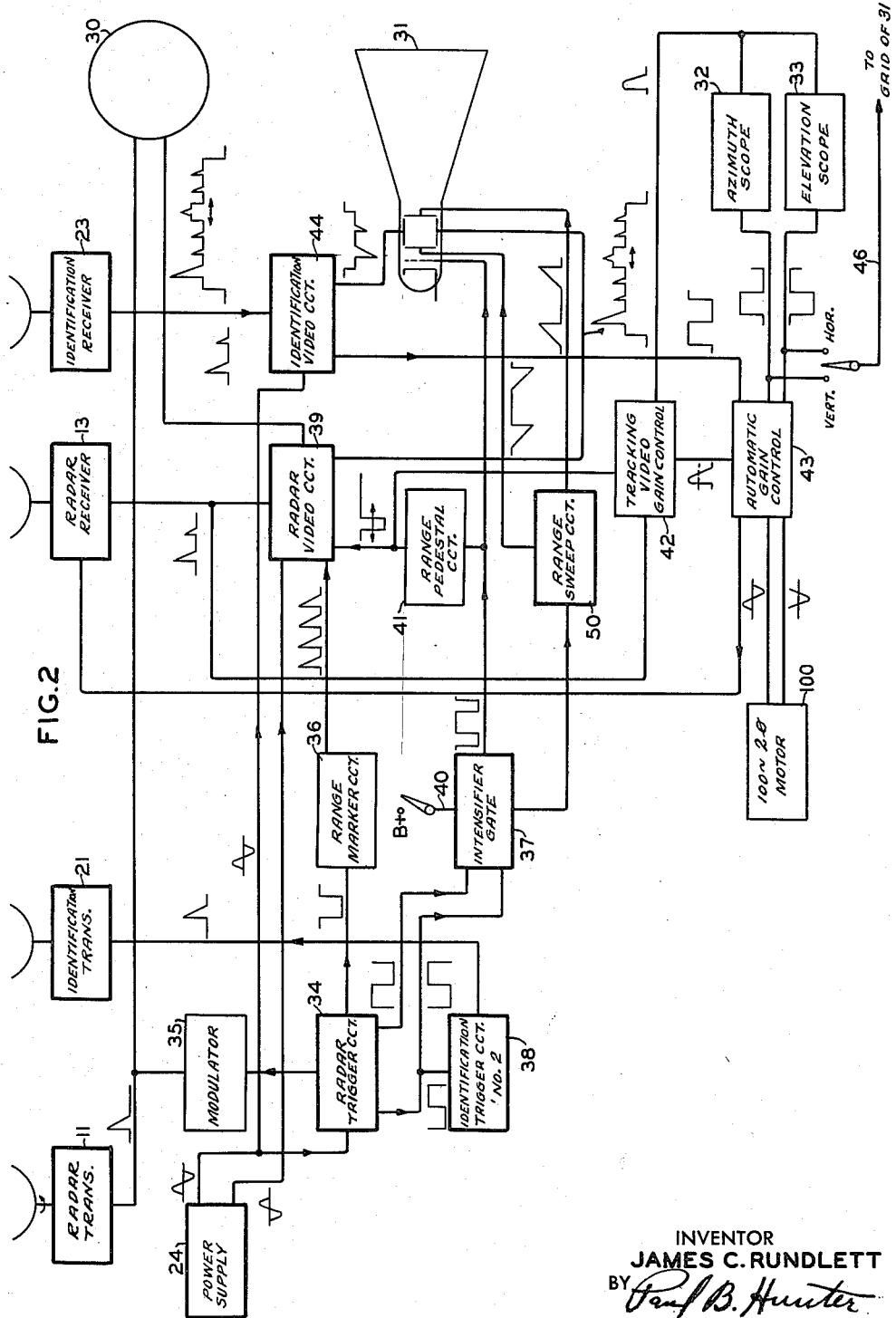
FIG. 2 is a functional block diagram used to illustrate one embodiment of the present invention.

In FIG. 2, the arrangement of control circuit or synchronizer 12 is shown in simplified block form with components that are directly involved in the dual channel or share time functions of the synchronizer and used in the present system being represented by accentuated blocks. The non-accentuated blocks in the diagram represent links in the overall system which help to illustrate interrelated functions therein. The wave forms shown are associated with the designated connecting links and refer to wave forms illustrataed in timing relationship in FIG. 3.

Since controlling the timing of the waves is the important feature of the system, it will be recognized that while a variety of input and output components must necessarily contain such wave forms as those illustrated, no strict limitations are imposed upon these forms since they are merely illustrative of the general function of the various components. Nor do these wave forms call for any particular design in the circuits in which they are generated. Thus it is that particularized details have been generally omitted and that the description of the presently improved share-time blanking synchronizer is limited to general outlines of its main functions.

The radar transmitter circuit produces several output voltages from the 400-cycle voltage applied to it.

The radar transmitter trigger pulse, occurring at the time when ($t$) equals 12 microseconds (FIG. 3B), is applied to the modulator 35 and to the represented plan position indicator scope 30. By this means, the plan position indicator scope sweep trace is made to start at the same time that the transmitter pulse is generated.

A negative square pulse (FIG. 3E), starting at the time when ($t$) equals 12 microseconds, is applied to range marker circuit 36 so that the range markers are synchronized with the transmitter pulse.

The two out-of-phase 400-cycle square waves (FIGS. 3C, 3D), starting at zero time, are applied to intensifier gate circuit 37 so that the range (A-type) scope 31 in the presentation system 19 can display both radar target echoes and identification signals. One of the square waves is also applied to the identification transmitter trigger circuit 38 so that the identification transmitter 21 is triggered at the start of the identification cycle (FIG. 3H), at the time when ($t$) equals 1,250 microseconds.

The range marker circuit 36 generates sharp pips at 61-microsecond intervals starting with the instant the transmitter operates. The interval between successive pips consequently represents a target range of 10,000 yards. The range marker pips are applied to the radar video circuit 39.

The identification transmitter trigger circuit 38 modifies the square-wave voltage it receives from the radar transmitter trigger circuit into a positive pulse starting at the time when ($t$) equals 1,250 microseconds (FIG. 3H). The pulse is supplied to the identification equipment to trigger the identification transmitter 21.

The intensifier gate circuit 37 supplies a negative square pulse or gate (FIG. 3F) starting at zero time and of approximately 430-microsecond duration to the range scope 31 of the presentation system 19. This pulse intensifies or unblanks the range scope and initiates the sweep voltages (FIGS. 3I, 3J) generated in range sweep circuit 50 for the range scope in order that echoes from targets may be displayed. The duration of the 430-microsecond pulse is more than sufficient for the desired 60,000-yard range of the equipment, since a range of 60,000 yards requires only a 366-microsecond sweep. When desired, switch 40 tied to a B+ voltage in the circuit activates a vacuum tube circuit so as to generate an additional second intensifier gate (FIG. 3F) starting at the time when ($t$) equals 1,250 microseconds. The sweep trace which results from this pulse is used to display the response pulses received from friendly targets to the challenge pulses sent out by the identification equipment. By this means, it is possible to distinguish between friendly and enemy targets. Each intensifier gate (FIG. 3F) is also applied to range pedestal circuit 41.

Range pedestal circuit 41 generates a pulse of short duration (either 1 or 3 microseconds) from the intensifier gate pulse. The time at which the pedestal pulse (FIG. 3G) occurs can be varied, and since it is displayed as a step or pedestal along the sweep trace of the range scope, it can be moved along the sweep trace and placed under any desired target echo. By this means, any target may be selected for purposes of tracking. When the intensifier gate circuit 37 is made to generate an additional gate for the display of identification signals, the range pedestal circuit 41 generates an additional second pedestal pulse which occurs during the identification cycle. However, the radar video mixer circuit 39 insures that this second pedestal is not applied to the range "A" scope 31. The identification sweep, consequently, does not display a range pedestal. The pedestal pulse is supplied to the radar video mixer circuit 39 and also to a tracking video gate circuit 42.

The radar video mixer circuit 39 is keyed by the 400-cycle $\beta$ sine wave voltage from the synchronizer power supply so that no output is obtained from the circuit during the identification cycle. The circuit combines the different input voltages received from the range marker circuit 36, the range pedestal circuit 41, and the radar receiver 13. The output from the circuit consists of the positive range marker pips, the positive range pedestal, and positive receiver video signals (including the transmitter pulse and target echoes), all of which are superimposed on a positive step resulting from the 400-cycle sine-wave voltage. This combined output is supplied to both the "A" range and the plan position indicator scopes 30, 31 of the presentation system 19 as shown in FIG. 2.

The tracking video gate circuit 42 receives the video output of the receiver system 13 and the pedestal pulse from the range pedestal circuit 41. It is gated by the pedestal pulse so that no target echo pulse can appear in the output of the circuit unless it occurs at the same time as the pedestal. Such is the case when a target is selected by placing the range pedestal on the range scope 31 under the desired target. The video pulses from the selected target are also lengthened or their time duration is increased, before application to the automatic gain control circuit 43 and to the two tracking scopes 32, 33 for display purposes.

The identification video circuit 44 receives the identification video signals from the receiver 23 of the identification equipment. It is keyed by the $\alpha$ sine-wave voltage from the synchronizer power supply 24 so that an output can be obtained from the circuit during the identification cycle only. The negative identification signals are thus superimposed on a negative step which results from the sine-wave voltage, and are supplied to the range scope 31. The range scope 31 displays the identification signals only if it receives the second intensifying pulse previously mentioned with reference to the intensifier gate circuit 37. The $a$ sine-wave voltage also results in the generation of a 400-cycle square-wave voltage which is applied to the automatic gain control circuit 43.

The automatic gain control circuit 43 supplies a varying voltage to the receiver system which automatically controls the gain of the receiver. It receives, from the 100-cycle generator 100 driven by the antenna spinner motor, two sine-wave voltages which differ in phase by an angle of 90 electrical degrees. These 100-cycle sine-wave voltages are converted to 200-cycle square-wave voltages whose phase difference is 180 degrees.

The automatic gain control voltage is controlled by these square-wave voltages and by the video signal from the tracking video gate circuit 42. If the amplitude of the video signal exceeds a certain value, the automatic gain control is reduced and the receiver gain decreased. The square-wave voltage from the identification video circuit 44 decreases the automatic gain control voltage to zero during the identification cycle and makes the radar receiver 13 inoperative at that time. The 200-cycle square-wave voltages are also applied to the two tracking scopes 32, 33. The scopes are unblanked alternately in order that alternate echoes from a selected target can be compared on each scope while tracking the target in azimuth and elevation.

By means of an anti-jamming blanking switch 46, either of the square-wave voltages may be selected for application to the range scope of the presentation system when desired. The arrangement is useful in overcoming certain types of jamming.

Presentation system 19 has three physical components as shown in block diagram, FIG. 4. These are the range indicator unit 28, which include a plan position indicator scope 30 and a horizontal sweep or "A" scope 31 and their associated circuits together with the two identical tracking indicators 32, 33, which differ only in the intensifying and sweep voltages applied to them.

The range indicator unit, as stated, includes the range and plan position indicator scopes 31, 30 and their associated circuits. The identification video circuit 44 consists of a single stage, an identification video clamper tube 52. This stage fixes the identification signals and the step on which they are superimposed at the proper D.-C. level for application to the upper vertical deflection plate 53 of the range scope 31. As shown in FIGS. 2 and 3K, the identification signals point downward from the identification sweep trace.

The range sweep circuit 50 supplies two sweep voltages which are of opposite phase to the horizontal deflecting plates 54, 55 of range scope 31. The negative going intensifier gate pulse from the synchronizer circuit 12 which is applied to the cathode 56 of the range scope 31 also acts to cut off the range sweep generator 57. A capacitor as shown in FIG. 5 connected in parallel with range sweep generator 57 charges at a fairly linear rate and produces a rising saw-tooth voltage which starts at zero time. Range sweep cathode follower 58 makes possible a feedback voltage which improves the linearity of the output saw-tooth voltage. From cathode follower 58 a positive saw-tooth voltage is obtained as shown in FIG. 3I.

A range sweep inverter 61 amplifies and inverts a portion of the saw-tooth voltage from cathode follower 58. The output therefrom is a saw-tooth voltage which has approximately the same amplitude as the output of the cathode follower 58 but is of opposite phase and as shown in FIG. 3J. Applied to the two horizontal deflecting plates 54, 55 are diode clampers 62 and 63 which fix the D.-C. levels of the sweep voltages applied to these plates. A linearly falling voltage is applied to the left deflecting plate 54 and a linearly rising voltage is applied to the right deflecting plate 55. The result on the screen of the range scope is a horizontal sweep trace which starts at zero time. However, when identification switch 40 is turned on, the synchronizer unit 12 supplies a second additional intensifier gate or pulse as shown in FIG. 3F to the range sweep circuit 50 and a second sweep trace on which the identification signals are displayed is produced.

Radar video circuit 64 accepts the mixed radar video signals from synchronizer 12 and supplies outputs which are displayed by range scope 31 and the plan position indicator scope 30. As shown in FIG. 4 radar video circuit 64 accepts the mixed radar video signals from the synchronizer 12 and amplifies them in radar video amplifier 65 and inverts the signal it receives from synchronizer 12. As stated, this signal includes radar receiving signals, range marker pips and the range pedestal which is used to select a target for tracking.

As with range sweep circuit 50 the radar video circuit also includes a range video clamper 66 which acts as a D.-C. restorer and fixes the output from the radar video amplifier 65 at a D.-C. level suitable for application to the lower deflecting plate 51 of range scope 31. Since the various signals superimposed on the steps are negative, the electron beam of the range scope 31 is deflected upward and the radar signals range markers and pedestal are displayed as upward deflections of the sweep trace.

Included in radar video circuit 64 is a plan position indicator video inverter 68 which inverts the negative signals from the radar video amplifier 65 and the negative steps on which they are superimposed, the positive going output signals are then applied to the grid 67 of the plan position indicator scope 30 and cause spots of increased intensity to appear along the sweep trace.

Plan position indicator sweep circuit 70 is triggered by the same synchronizing pulse which is applied to the transmitted system. At the instant transmitter 11 fires, the plan position indicator sweep circuit 70 starts a linearly rising current flow toward the deflection coil 60 of the plan position indicator scope 30. At the same time the sweep circuit 70 causes the plan position indicator scope to be intensified for the duration of the sweep.

As stated, the present detecting-tracking system operates with a 400-cycle pulse repetition frequency and has four transmitter pulses synchronized with one spin motor revolution of its microwave antenna. However, azimuth tracking scope 32 displays only the second and fourth target echoes in the process of conical scanning. The echoes from the target selected for tracking are applied to the upper vertical deflecting plates but a 200 cycle blanking voltage applied to the control grid allows only alternate echoes to be displayed. The sweep voltage applied to the horizontal deflecting plates is a sine-wave voltage obtained from 100 cycle generator 100. The echoes from the selected target which are applied to the azimuth tracking scope 32 are also applied to the elevation tracking scope 33. However, the phase of a blanking voltage in this case is such that only elevation signals are displayed comparable to pulses one and three in the process of conical scanning. The voltage applied to the elevation scope is the opposition phase voltage obtained from the 100 cycle generator 100.

In FIG. 5 a simplified schematic diagram of the range sweep circuit 50 for range indicator 31 is shown together with radar and identification video input circuits 64, 52 to indicator 31 as shown in FIG. 4.

The range sweep generator consists of a tube 57. The input to the circuit is the negative intensifier gate from synchronizer 12.

The intensifier gate starts at zero time, has a duration of approximately 430 microseconds, and is used to generate the radar sweep. In the discussion dealing with the synchronizer unit, it was stated that when switch 40 is turned on, an additional intensifier gate is obtained. This second gate is similar to the first but starts at the time when $(t)$ equals 1,250 microseconds. This additional intensifier gate generates the identification sweep.

Section C of the range selector switch 72 places capacitors 73 and 74 into the circuit for the 30,000 yard range, and only capacitor 73 for the 60,000 yard range. Either one of two variable resistors 75 and 76 is selected by means of section D of the same switch 72.

The operation of the range sweep generator 57 may be readily understood by assuming that the range switch is in the 60,000 yard position; that is, capacitor 74 is not in the circuit and resistor 76 has been placed in the plate circuit of tube 71. Tube 57 is connected across condenser 73. Between input pulses, the tube conducts heavily and the potential across condenser 73 is approximately 20 volts. The negative intensifier gate cuts off the flow of plate current, allowing condenser 73 to charge through resistor 77 in series with 76. At the termination of the gate, the tube is again allowed to conduct and the capacitor is very rapidly discharged. The positive saw-tooth voltage (approximately 150 volt amplitude) thus developed is applied to the grid 49 of the range sweep cathode follower 58.

The output of the cathode follower 58 is also a positive saw-tooth voltage and is fed back through capacitor 78 to the junction of resistor 77 and resistor 76. As a result of this feedback arrangement, the charging potential which is applied to charge capacitor 73 is not a fixed D.-C. potential. The potential toward which the capacitor charges increases steadily. Normally, as the capacitor voltage approaches the applied D.-C. charging potential, the rate at which the capacitor charges decreases and a logarithmic charging curve results. In this case, since the applied potential itself increases steadily, the rate at which capacitor 73 charges is maintained fairly constant. By this means, it is possible to obtain a large amplitude output and yet retain the linear voltage rise which is necessary for a linear sweep.

The 430 microsecond intensifier gate has a longer duration than is necessary for a 60,000 yard range since the time required for radio waves to travel a distance of 120,000 yards is approximately 366 microseconds. The undesired portion of the sweep trace can be extended beyond the edge of the range scope screen 79 by decreasing resistor 76. If resistor 76 is decreased, condenser 73 charges more rapidly and the length of the sweep trace is decreased.

For the 30,000 yard range, the amount of capacitance is decreased by placing condenser 74 in series with condenser 73. The rate at which the saw-tooth voltage rises is therefore increased. As shown in the wave form for the 30,000 yard range (FIG. 3I dashed line), the capacitors in this case become fully charged during the intensifier gate pulse and a flat-topped saw-tooth voltage results. However, the first 183 microsecond portion of the sweep voltage occurs during the linear rise and, by means of resistor 75, the remainder of the sweep trace is made to extend beyond the edge of the screen.

The input to the range sweep cathode follower 58 is the positive saw-tooth voltage obtained from the sweep generator 57. The cathode follower 58 provides decoupling so as to make possible the feedback arrangement used in the sweep generator 57. The output positive saw-tooth voltage (approximately 140 volt amplitude) developed across the cathode resistor 79 accomplishes three functions; first, it is applied to the sweep generator 57 to supply the feedback previously discussed; second, it is applied to the right horizontal deflecting plate 55 through a clamping circuit 62; and third, it is applied to the range sweep inverter 61, where it is inverted for application to the left horizontal deflecting plate 54.

Resistor 80 and resistor 81 allow only a portion of the positive saw-tooth voltage obtained from cathode follower 58 to be applied to range sweep inverter 61.

Resistors 81 and 82 form a voltage divider between −105 volts and ground. Since the grid 83 of tube 61 is connected to the junction of the resistors 81 and 82, tube 61 is biased at approximately −10 volts during the time between sweep cycles. During the time of the sweep saw tooth, the grid voltage rises and the output obtained from plate 84 has approximately the same amplitude as that obtained from cathode follower 58 but is of opposite phase. This voltage is applied to the left horizontal deflecting plate 54 through a clamping circuit 63. While the potential applied to the left deflecting plate 54 falls, that applied to the right deflecting plate 55 rises. The electron beam is consequently swept from left to right across the screen, and a horizontal sweep trace is produced.

Capacitors 85 and 86 reduce the amount of distortion introduced by the amplifier. Distortion often results from the loss of the high-frequency components of the input saw-tooth voltage. Capacitor 85 passes high frequencies directly to the grid of the inverter so that they are amplified to a greater extent than low frequencies. However, negative feedback at high frequencies is provided by capacitor 86 between the plate and grid. The result of the two actions is to maintain a constant responce to the high-frequency components of the saw-tooth voltage.

Before application to the horizontal deflecting plates 54, 55, both the falling and the rising saw-tooth voltages are clamped or restored with reference to a fixed D.-C. potential. Tubes 62 and 63 comprise the two clamping circuits. These triode tubes are used as diodes by connecting corresponding plates and grids together.

The input to tube 62 is the positive saw-tooth voltage from the cathode follower. The plate of the diode 62 is connected to a potential of approximately −75 volts and D.-C. restoration takes place with respect to that voltage level. Thus the rising saw-tooth voltage applied to the right horizontal deflecting plate starts at an initial potential of −75 volts.

The second diode tube 63 restores the negative saw-tooth output of the range sweep inverter 61 with respect to a variable D.-C. potential. The cathode of diode tube 63 is connected to a variable tap on potentiometer 89 which forms part of a voltage divider between +300 volts and −105 volts. The D.-C. level with respect to which D.-C. restoration occurs can thus be varied between the aproximate limits of +100 volts and −105 volts by means of resistor 88, the horizontal adjustment resistor. The output of the diode 63, which is a negative saw-tooth voltage restored completely below a level determined by the setting of resistor 88 is applied to the left horizontal deflecting plate 54 of scope 31.

Suppose that the tap on resistor 88 is set at a potential of +75 volts. During the interval between consecutive sweep cycles, the potential applied to left plate 54 is fixed at +75 volts. The 150 volt potential difference between the two plates causes the electron beam to be deflected initially toward the left edge of the scope screen. However, the beam does not strike the screen at this time because the grid 90 of range scope 31 is sufficiently negative with respect to cathode 91 that the electron beam current is cut off. FIGURE 5 shows that the negative intensifier gate pulse which is applied to the range sweep generator 57 is also applied to the cathode 91 of the range scope 31. Thus at the time when ($t$) equals 0, the biasing voltage is removed from range scope 31 and the scope is intensified. At the same time, the sweep voltage starts. Initially, the beam strikes the screen near its left edge because of the difference of potential between the two horizontal deflecting plates 54, 55. During the sweep cycle, the potential on left plate 54 falls while the potential on right plate 55 rises. The beam is thus swept from left to right across the screen 79 and a horizontal sweep trace is produced. The undesired portion of the sweep trace, that is, the portion of the sweep trace which extends beyond the desired ranges of 30,000 yards and 60,000 yards, is extended beyond the right edge of the screen by means of the sweep length control (D of switch 72). At the termination of the sweep voltage, the beam is rapidly returned to its initial position near the left edge of the screen in preparation for the next sweep cycle. The return trace is not visible because the intensifier gate is removed at the same time. By varying the initial potential difference between the two horizontal deflecting plates 54, 55, resistor 88 controls the starting point of the sweep trace. It enables the entire trace to be shifted horizontally across the screen.

When the identification switch 40 is turned on, the second intensifier gate starting at the time when ($t$) equals 1,250 microseconds is applied to the cathode 91 of the range scope and a second sweep cycle occurs. The resulting sweep trace appears below the first sweep trace so that two traces are observed on the screen 79 of range scope 31.

A three-position anti-jamming blanking switch 46 in the synchronizer unit 12 allows either of the 200 cycle square-wave voltages derived from motor 16 to be applied to the presentation system 19. These voltages are applied to the grid 90 of the range scope 31. The anti-jamming blanking voltages are used to decrease the effect of jamming.

Tube 65 is the radar video amplifier. The input to the circuit as shown in FIG. 2 is the mixed radar video output from the synchronizer 12. It includes the radar transmitter pulse and radar target echoes, the range pedestal, and the 10,000 yard range markers. All of these signals are positive pulses or pips and all are superimposed on a positive step which extends from the time when ($t$) equals 0 microseconds to the time when ($t$) equals 1,250 microseconds. The input to the video amplifier 65 is amplified and inverted and a negative output is obtained as shown in FIG. 3L. The output is applied to the range video clamper 66 and to the plan position indicator video inverter 68.

The range video clamper, tube 66, is also connected as a diode. Since the cathode 97 of the diode is connected to a potential of approximately +48 volts, D.-C. restoration occurs with respect to that potential. The output of clamper 66 is applied to the lower vertical deflecting plate 51 of range scope 31.

At the time immediately preceding the start of the radar sweep, the lower vertical deflecting plate 51 is at approximately +48 volts. The beam is repelled upward by the negative transmitter pulse, the negative target echoes, the negative range pedestal, and the negative range marker pips. Consequently, these all appear as vertical deflections extending upward from the sweep trace.

The sweep trace on the range scope starts at the time when (t) equals 0 microseconds while the transmitter pulse occurs at the time when (t) equals 12 microseconds. No error is introduced by this fact since the 10,000 yard range markers occur at 61-microsecond intervals starting with the time of the transmitter pulse. The first 12 microseconds of the sweep trace are therefore not used.

The identification video circuit, the identification video clamper 52, is also connected as a diode.

The input supplied to this circuit by the synchronizer is originally obtained from the identification equipment and is negative. It consists of the identification transmitter pulse and the responses received from friendly aircraft.

These pulses are superimposed on a negative step which starts slightly before the time when (t) equals 1,250 microseconds and ends a short time before the time when (t) equals 2,500 microseconds. The cathode 98 of diode 52 is connected to the tap on potentiometer 99, so that the potential with respect to which D.-C. restorations occur is variable between the approximate limits of —105 and +100 volts. The restored output is applied to the upper vertical deflecting plate 53 of range scope 31. Since the identification signals are negative, they deflect the beam downward and thus appear on the scope screen as vertical pips which extend downward from the identification sweep trace.

The identification transmitter pulse and response pulses do not appear on the range scope unless they occur at a time when the scope is intensified and a sweep voltage is applied to horizontal deflecting plates 54, 55. This occurs only when the switch 40 is turned on.

When the radar sweep cycle starts, at the time when (t) equals 0 microseconds, the lower vertical deflecting plate 51 is at a potential of less than +48 volts because of the negative step on which are superimposed the radar video voltages. At the same time the upper vertical plate is at a potential determined by the setting of potentiometer 99.

Slightly before the start of the identification sweep cycle, the lower vertical deflecting plate 51 rises to +48 volts. At the same time, the potential applied to the upper deflecting plate 53 falls because of the negative step on which are superimposed the identification signals. Therefore, when the identification sweep trace starts, the electron beam is deflected downward and the identification sweep trace appears directly below the radar sweep trace giving a picture as shown in FIG. 4 on the screen 79 of scope 31.

The function of the steps on which are superimposed the video signals now becomes obvious. They make possible a trace separation so that the identification sweep trace does not coincide with the radar sweep trace. Identification video signals are displayed as vertical pips which extend downward from the lower sweep trace while radar signals extend upward from the upper sweep trace.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for identifying aircraft comprising a pair of transmitters alternately radiating discrete bursts of electromagnetic energy toward said aircraft at identical pulse recurrence frequencies and at different carrier frequencies, said aircraft being equipped with transponder apparatus for the transmission of an identification signal in response to said electromagnetic energy having a predetermined carrier frequency, a pair of receivers, one of said receivers receiving an echo signal reflected by said aircraft and the other of said receivers receiving said identification signal, an electronic indicator including sweep generating means for establishing an electron trace thereon, means synchronizing the generation of said trace with the transmission of said energy by said transmitters, and means routing the received signals from each of said receivers to said indicator for the purpose of comparing said signals along said trace.

2. Apparatus for detecting and identifying an object, said apparatus comprising a pair of transmitters operative at different carrier frequencies and radiating bursts of electromagnetic energy at identical pulse recurrence frequencies, means for keying said transmitters alternately, said object being equipped with transponder apparatus for the transmission of an identification signal in response to said electromagnetic energy having a predetermined carrier frequency, a pair of receivers, one of said receivers receiving an echo signal reflected by said object and the other of said receivers receiving said identification signal, an electronic indicator including sweep generator means for establishing electron traces thereon, means routing the received signals from each of said receivers to said indicator, synchronizing means correlating the inception of said traces with the radiation of said transmitters, and intensifier means associated with said synchronizing means to activate said indicator so as to present said received signals along said traces.

3. Apparatus for identifying aircraft comprising a pair of transmitters for radiating electromagnetic energy toward said aircraft, means for keying said transmitters alternately, said aircraft being equipped with transponder apparatus for the transmission of an identification signal in response to said electromagnetic energy, a pair of receivers, one of said receivers receiving an echo signal reflected by said aircraft and the other of said receivers receiving said identification signal, electron beam indicator means for depicting received signals from each of said receivers, and synchronizing means correlating the operation of said indicator means with said transmitters, said synchronizing means including beam intensifier means for activating said indicator means.

4. Apparatus for detecting and identifying an object, said apparatus comprising a pair of transmitters operative at different carrier frequencies and radiating bursts of electromagnetic energy at identical pulse recurrence frequencies, means keying said transmitters alternately, said object being equipped wthi transponder apparatus for the transmisson of an identification signal in response to said electromagnetic energy having a predetermined carrier frequency, a pair of receivers, one of said receivers receiving an echo signal reflected by said object and the other of said receivers receiving said identification signal, an electronic indicator including sweep generating means for establishing an electron trace at twice the aforesaid pulse recurrence frequency thereon, means routing received signals from each of said receivers to said indicator, synchronizing means correlating the inception of said trace with the radiation of said transmitters, intensifier means associated with said synchronizer to activate said indicator, and inverter means associated with said indicator to invert one of said signals on said trace so as to readily compare both of said received signals along said trace.

5. Apparatus for identifying an object, said apparatus comprising a pair of transmitters for radiating electromagnetic energy toward said object, one of said transmitters radiating a rotatable beam of electromagnetic energy, means for keying said transmitters alternately at a repetition rate which is a multiple of the speed of rotation of said rotatable beam of electromagnetic energy, said object being equipped with transponder apparatus for the transmission of an identification signal in response to said electromagnetic energy, a pair of receivers, one of said receivers receiving an echo signal reflected by said object and the other of said receivers receiving said identification signal, indicator means for depicting the received signals, and synchronizing means correlating said transmitters with said indicator means, said synchronizing means including intensifier means for activating said indicator.

6. Apparatus for identifying an object, said apparatus comprising a pair of transmitters for radiating electromagnetic energy toward said object, one of said transmitters rotatably radiating a conical beam of electromagnetic energy, means for keying said transmitters alternately at a repetition rate which is a multiple of the speed of rotation of said rotatable beam of electromagnetic energy, said object being equipped with transponder apparatus for the transmission of an identification signal in response to said electromagnetic energy, a pair of receivers, one of said receivers receiving an echo signal reflected by said aircraft and the other of said receivers receiving said identification signal, indicator means for depicting the received signals, and synchronizing means correlating said transmitters with said indicator means, said synchronizing means including intensifier means for activating said indicator.

7. Apparatus for identifying an object, said apparatus comprising a pair of transmitters for radiating electromagnetic energy at different carrier frequencies toward said object, one of said transmitters including means for radiating a rotatable beam of electromagnetic energy and further including means for moving said rotatable beam in azimuth and in elevation, means for pulsing said transmitters alternately at an identical repetition rate which is a multiple of the speed of repetition of said rotatable beam of electromagnetic energy, said object being equipped with transponder apparatus for the transmission of an identification signal in response to said electromagnetic energy having a predetermined carrier frequency, a pair of receivers, one of said receivers receiving an echo signal reflected by said object and the other of said receivers receiving said identification signal, indicator means for depicting the received signals, and synchronizing means including intensifier means for activating said indicator.

References Cited in the file of this patent

UNITED STATES PATENTS

| | | |
|---|---|---|
| 2,189,549 | Hershberger | Feb. 6, 1940 |
| 2,225,046 | Hunter | Dec. 17, 1940 |
| 2,312,203 | Wallace | Feb. 23, 1943 |
| 2,407,898 | Norgaard | Sept. 17, 1946 |
| 2,515,178 | Barchok | July 18, 1950 |
| 2,527,547 | Hardy | Oct. 31, 1950 |
| 2,540,087 | Barchok et al. | Feb. 6, 1951 |
| 2,586,888 | Varela | Feb. 26, 1952 |
| 2,640,983 | Stokes et al. | June 2, 1953 |